(12) United States Patent  
Wada

(10) Patent No.: US 12,511,996 B2
(45) Date of Patent: Dec. 30, 2025

(54) DRIVING ASSISTANCE DEVICE FOR VEHICLE

(71) Applicant: TOYOTA JIDOSHA KABUSHIKI KAISHA, Toyota (JP)

(72) Inventor: Yosuke Wada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 19 days.

(21) Appl. No.: 18/784,965

(22) Filed: Jul. 26, 2024

(65) Prior Publication Data

US 2025/0140113 A1 May 1, 2025

(30) Foreign Application Priority Data

Oct. 25, 2023 (JP) ................................. 2023-183476

(51) Int. Cl.
G08G 1/0967 (2006.01)

(52) U.S. Cl.
CPC .................................. *G08G 1/0967* (2013.01)

(58) Field of Classification Search
CPC .................................................. G08G 1/0967
See application file for complete search history.

(56) References Cited

U.S. PATENT DOCUMENTS

| 6,853,311 B2* | 2/2005 | Taniguchi | B60Q 9/008 |
|---|---|---|---|
| | | | 340/436 |
| 9,835,468 B2 | 12/2017 | Yoshitomi et al. | |
| 10,017,178 B2 | 7/2018 | Morimoto et al. | |
| 10,132,642 B2 | 11/2018 | Yoshitomi et al. | |
| 10,643,474 B2* | 5/2020 | Yamada | G06V 20/56 |
| 10,679,077 B2 | 6/2020 | Kinoshita et al. | |
| 10,994,750 B2* | 5/2021 | Watanabe | B60W 50/14 |
| 11,010,624 B2 | 5/2021 | Hayashi et al. | |
| 11,017,247 B2 | 5/2021 | Hayashi et al. | |
| 11,117,595 B2 | 9/2021 | Sasaki et al. | |
| 12,103,531 B2* | 10/2024 | Kim | B60W 30/146 |
| 2004/0145460 A1* | 7/2004 | Taniguchi | B60Q 9/008 |
| | | | 340/435 |
| 2009/0254259 A1* | 10/2009 | The | B60K 31/0058 |
| | | | 342/357.31 |
| 2011/0090076 A1 | 4/2011 | Nakamura | |
| 2016/0325750 A1* | 11/2016 | Kanda | B60W 30/18163 |
| 2019/0088137 A1* | 3/2019 | Yamada | B60R 1/12 |

(Continued)

FOREIGN PATENT DOCUMENTS

JP 2009-294707 A 12/2009

*Primary Examiner* — Hoi C Lau
(74) *Attorney, Agent, or Firm* — SoraIP, Inc.

(57) ABSTRACT

The driving assistance ECU includes a speed limit acquisition unit that acquires a speed limit applied to the own vehicle, and a vehicle speed acquisition unit that acquires an own vehicle speed that is a speed of the own vehicle, and performs a first notification (a first speeding notification) when the own vehicle speed is higher than the speed limit. The driving assistance ECU performs additional notification (second speeding notification) when it is determined that a predetermined alert condition is satisfied when the vehicle speed is predicted to increase or increase due to the relative positional relation between the preceding vehicle traveling in front of the own vehicle and the own vehicle in a state where the state where the own vehicle speed is higher than the speed limit continues after the first notification.

5 Claims, 6 Drawing Sheets

(56) References Cited

U.S. PATENT DOCUMENTS

| | | | |
|---|---|---|---|
| 2019/0100135 A1* | 4/2019 | Rothenberg | B60K 31/18 |
| 2021/0046946 A1* | 2/2021 | Nemec | G05D 1/0061 |
| 2021/0247526 A1 | 8/2021 | Kijima | |
| 2023/0090823 A1* | 3/2023 | Nemec | G05D 1/0088 |
| | | | 340/438 |
| 2023/0373489 A1* | 11/2023 | Kim | B60W 30/18109 |
| 2025/0042397 A1* | 2/2025 | Tezuka | B60W 60/001 |
| 2025/0140113 A1* | 5/2025 | Wada | G08G 1/0967 |

* cited by examiner

FIG. 6

| SETTING | SPEEDING THRESHOLDS OSth | FIRST TO FOURTH OWN VEHICLE SPEED INCREASING THRESHOLDS |
|---|---|---|
| SETTING 1 | 10·A [km/h] | 15·A [km/h] |
| SETTING 2 | 5·A [km/h] | 10·A [km/h] |
| SETTING 3 | 2·A [km/h] | 5·A [km/h] |

DRIVING ASSISTANCE DEVICE FOR VEHICLE

CROSS-REFERENCE TO RELATED APPLICATION

This application claims priority to Japanese Patent Application No. 2023-183476 filed on Oct. 25, 2023, incorporated herein by reference in its entirety.

BACKGROUND

1. Technical Field

The disclosure relates to a driving assistance device for a vehicle that gives an alert notification to an occupant regarding an own vehicle speed, when speed of the own vehicle (i.e., own vehicle speed) is in a state of exceeding a speed limit (i.e., maximum speed).

2. Description of Related Art

In a conventional device, when determination is made that an own vehicle has entered a road of a different type, based on a current position of the own vehicle and map data, an occupant of the own vehicle is notified of speeding when a cumulative travel distance of the own vehicle on the road that has been entered is no more than a predetermined distance, and also speed of the own vehicle is higher than a speed limit (maximum speed) of the road that has been entered (see Japanese Unexamined Patent Application Publication No. 2009-294707 (JP 2009-294707 A)).

SUMMARY

However, in the conventional device, when the own vehicle continues to travel on the same road at a speed higher than the speed limit after the notification is given once, the notification is not given a second time or more. Accordingly, a driver may continue driving the own vehicle without noticing that the own vehicle speed is exceeding the speed limit. On the other hand, when the speeding notification is constantly given, the driver may consider the notification to be irksome.

The disclosure has been made to solve such problems. That is to say, an object of the disclosure is to provide a driving assistance device for a vehicle, which is capable of giving a notification regarding speeding at an appropriate timing when the own vehicle speed continues to exceed the speed limit.

An aspect of a driving assistance device according to the disclosure includes:
a speed limit acquisition unit (20, 80) for acquiring a speed limit applied to an own vehicle, an own vehicle speed acquisition unit (93) that acquires an own vehicle speed that is a speed of the own vehicle, and an alert notification unit that performs a first notification (first alert notification) (S315) when the own vehicle speed is higher than the speed limit, and performs an additional notification (second alert notification) (S345) when, in a state in which a state of the own vehicle speed being higher than the speed limit continues after the first notification, a predetermined alert condition that is satisfied when the own vehicle speed increases or is predicted to increase due to a relative positional relationship between a preceding vehicle traveling ahead of the own vehicle, and the own vehicle, is satisfied (Yes in S340).

According to this aspect, the first notification is given when the own vehicle speed is higher than the speed limit, and then the additional notification is performed when the predetermined alert condition is satisfied. The alert condition is a condition that is satisfied when the own vehicle speed increases, or is predicted to increase, due to a relative positional relation between a preceding vehicle and the own vehicle, and is a condition that is satisfied in the following cases, for example.

Case 1: When the state of the own vehicle changes from a state in which the own vehicle is traveling while tracking the preceding vehicle, to a state in which the own vehicle is executing an overtaking operation for overtaking the preceding vehicle.

Case 2: When the state of the own vehicle changes from a state in which the own vehicle is traveling while tracking the preceding vehicle, to a state in which the preceding vehicle is no longer present, and also the own vehicle speed increases by no less than "independent acceleration determination threshold value that is a value of no less than 0" from the point in time at which the preceding vehicle is no longer present.

Case 3: When a state of the own vehicle changes from a state in which the own vehicle is traveling while tracking the preceding vehicle, to a state in which the preceding vehicle accelerates, and also the own vehicle speed increases by no less than "tracking acceleration determination threshold value that is a value no less than 0" from a point in time at which the preceding vehicle starts accelerating.

Accordingly, when the driver of the own vehicle is accelerating or is likely to accelerate the own vehicle due to the relative positional relation with the preceding vehicle, an additional notification is given. Thus, the driver is easily made to be aware that the own vehicle speed is exceeding the speed limit. Further, this additional notification is not constantly performed, and accordingly the likelihood of causing the driver to consider the notification to be irksome can be reduced.

In the above description, in order to facilitate understanding of the disclosure, names and/or signs used in the embodiments are enclosed in parentheses or quotes, with respect to configurations of the disclosure corresponding to the embodiments described below. However, the components of the disclosure are not limited to the embodiments defined by the names and/or signs. The disclosure also encompasses to a driving assistance method for a vehicle (notification method of speeding), and a program thereof.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a table used in a modification of the first to third embodiments of the present disclosure.

DETAILED DESCRIPTION OF EMBODIMENTS

1. First Embodiment

The "vehicle driving assistance device DS (hereinafter, referred to as "device DS")" according to the first embodiment of the present disclosure includes the components illustrated in FIG. 1, and is applied to (mounted on) the own vehicle HV. The own vehicle HV may be any of a vehicle using an internal combustion engine as a power source, a vehicle using an electric motor as a power source (that is, a battery electric vehicle), a hybrid electric vehicle, and the like.

As used herein, an "ECU" is an electronic controller (control unit) that includes a microcomputer that includes a CPU (processor), a ROM, RAM, data-writable non-volatile memories, interfaces, and the like. ECU are also referred to as controllers or computers. The plurality of ECU shown in FIG. 1 are connected to each other through a CAN (Controller Area Network) so as to be able to exchange information. Some or all of these ECU may be integrated into one ECU.

Figure 1:
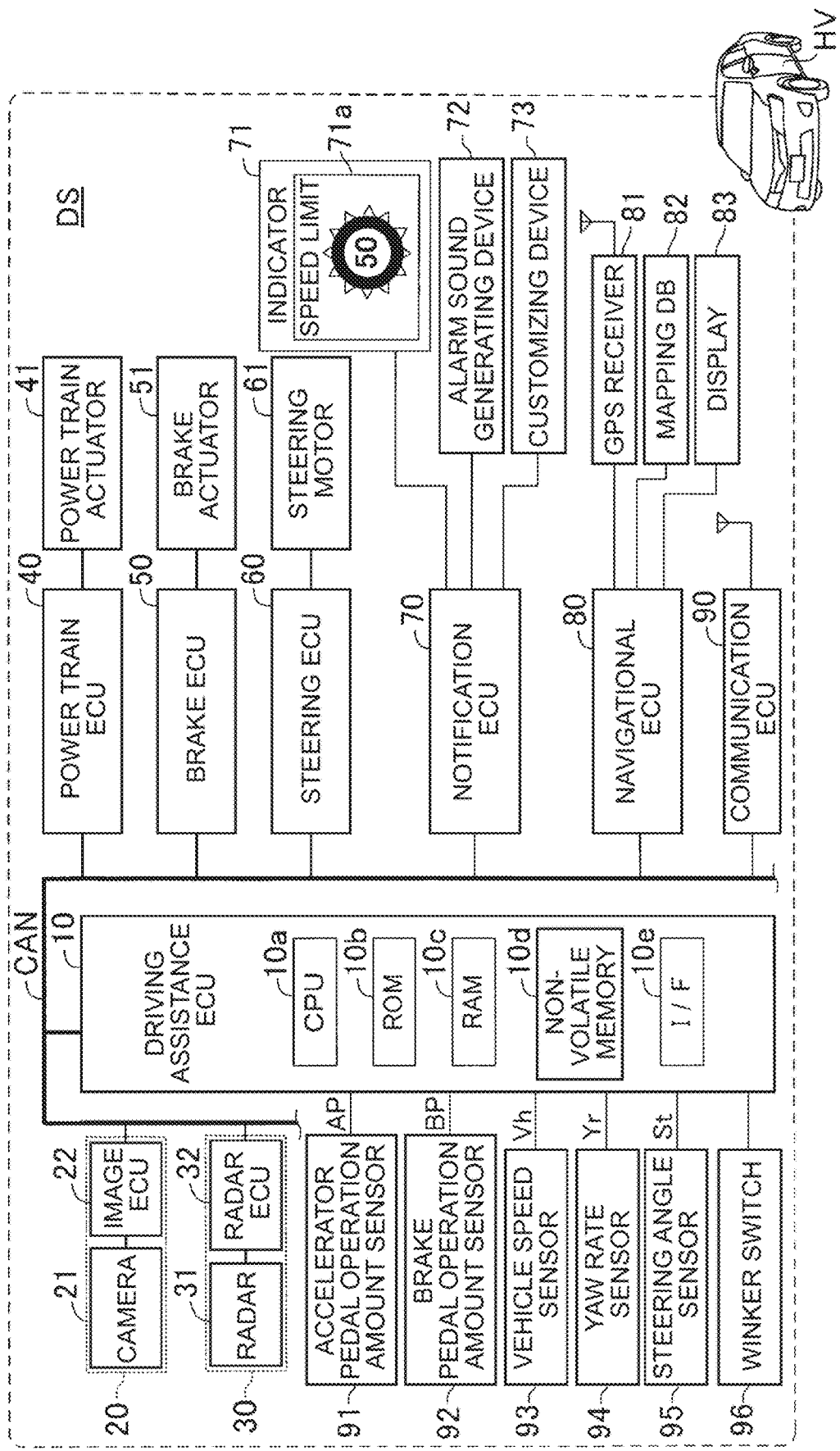
FIG. 1 is a schematic configuration diagram of a vehicle driving assistance device according to a first embodiment of the present disclosure.

When the speed of the own vehicle HV (i.e., the own vehicle speed) exceeds the speed limit (i.e., the maximum speed) set and applied to the lane on which the own vehicle HV is traveling, the driving assistance ECU 10 uses the components illustrated in FIG. 1 to issue an alert (speeding notification) for causing the occupant of the own vehicle HV (in particular, the driver) to recognize that "the own vehicle speed exceeds the speed limit".

The camera device 20 includes a camera 21 and an image ECU 22. Each time a predetermined period of time elapses, the camera 21 captures a scene in front of the own vehicle HV and acquires image-data. The image ECU 22 generates camera information by analyzing the image data from the camera 21, and transmits the camera information to the driving assistance ECU 10. The camera information includes camera target information such as the image data itself, the position of the captured target object with respect to HV of the own vehicle, the relative longitudinal speed, the relative lateral speed, and the type. The camera information further includes lane information such as a lane widthwise position (lateral position) and an angle of the own vehicle HV with respect to a demarcated line (white line and yellow line) of a road on which the own vehicle HV is traveling. The types of targets include moving objects such as other vehicles and pedestrians, and structures such as guardrails and utility poles. The driving assistance ECU 10 extracts, based on the image data acquired by the camera device 20, a symbol similar to the road sign indicating the speed limit (maximum speed) included in the image data. Driving assistance ECU 10, the numerical value shown in the extracted symbol is set/applied to the lane the own vehicle HV is currently traveling (hereinafter, also referred to as "host lane") (maximum speed, the speed limit for alert) to obtain as. The restricted vehicle speed may be acquired by the image ECU 22.

The radar device 30 is a well-known device that acquires information about a target object existing in the vicinity of the own vehicle HV by using a millimeter-wave band radio wave, and includes a radar 31 and a radar ECU 32. Each time a predetermined time elapses, the radar 31 transmits millimeter waves within a predetermined detection range and receives millimeter waves reflected by the target object. The radar 31 transmits the transmitted and received millimeter-wave data to the radar ECU 32. The radar ECU 32 acquires radar information based on the information from the radar 31, and transmits the radar information to the driving assistance ECU 10. The radar information includes a distance to the target, an orientation of the target, a relative velocity of the target, and the like.

The power train ECU 40 drives the power train actuator 41 to control a driving device including a power source of an own vehicle HV (not shown), thereby generating a driving force.

The brake ECU 50 controls a braking device on the own vehicle HV (not shown) by driving the brake actuator 51, thereby applying a braking force to the own vehicle HV.

The steering ECU 60 controls the steering device of the own vehicle HV (not shown) by driving the steering motor 61, thereby changing the steering angle of the own vehicle HV.

The notification ECU (alarm ECU) 70 is connected to an indicator 71 disposed at a position visible from the driver's seat and an alarm sound generating device 72 that generates an alarm sound, and controls these in response to an instruction (instruction signal) from the driving assistance ECU 10. The indicator 71 is provided with an area 71a for displaying a speed limit (maximum speed). The notification ECU 70 displays the speed limit included in the instruction from the driving assistance ECU 10 in the area 71a. Further, the notification ECU 70 blinks the symbol for calling attention to the surroundings of the displayed speed limit while blinking the displayed speed limit. In addition, the notification ECU 70 generates a notification sound (for example, a notification sound in which a sound "pawn" is repeated) from the alarm sound generating device 72. Thus, the notification ECU 70 notifies the occupant (in particular, the driver) of the own vehicle HV that the own vehicle speed exceeds the speed limit. This notification is hereinafter referred to as "speeding notification", "notification for alerting of speeding" or "alert notification". Furthermore, the notification ECU 70 is connected to a customizing device 73 operated by the driver. By operating the customizing device 73, the driver can change the "speeding threshold OSth at the time of executing the alert notification" described later.

The navigation ECU 80 is connected to a GPS receiver 81, a map database 82, and a display touch panel 83 that displays touch buttons, and constitutes an in-vehicle navigation system. The navigation ECU 80 acquires the present position of the own vehicle HV based on GPS received by GPS receiver 81. The navigation ECU 80 generates a recommended route from the present position to the "destination inputted via the display touch panel 83" based on the map data stored in the map database 82. The navigation ECU 80 sets one of the recommended routes as the scheduled traveling route in accordance with an instruction from the driver, and then executes the known route guidance. Further, the navigation ECU 80 acquires the speed limit set/applied to the own lane at the present time based on the acquired current position and map-data of the own vehicle HV.

The communication ECU 90 wirelessly communicates with an external device (for example, a roadside device, an information managing center, and the like) of the own vehicle HV, and acquires various kinds of information from the external device.

The driving assistance ECU 10 receives the detected values (output values) of the following "sensors and switches".

An accelerator pedal operation amount sensor 91 that detects an accelerator pedal operation amount AP of the own vehicle HV.

A brake pedal operation amount sensor 92 that detects a brake pedal operation amount BP of the own vehicle HV.

The vehicle speed sensor 93 detects the speed of the own vehicle HV (that is, the own vehicle speed SPD).

A yaw rate sensor 94 for detecting a yaw rate Yr of the own vehicle HV.

A steering angle sensor 95 for detecting a steering angle St of the own vehicle HV.

A winker switch 96 for generating a signal indicating the flashing status of the directional indicator of the own vehicle HV. The winker switch 96 generates a signal when a winker lever provided in a steering column (not shown) is operated by a driver. When the winker lever is rotated in the counterclockwise direction, the winker switch 96 generates a signal for flashing the direction indicator disposed on the left side of the own vehicle HV. The winker switch 96 generates a signal for blinking a direction indicator disposed on the right side of the own vehicle HV when the winker lever is rotated in the clockwise direction. The direction indicator blinks according to the signal of the winker switch 96. The driving assistance ECU 10 is also connected to other sensors (for example, a steering torque sensor) other than those described above.

Overview of Operation

The device DS acquires the speed limit (maximum speed) SPDLT of the lane on which the own vehicle HV is traveling, and performs the first speed speeding notification when it is determined that the own vehicle speed SPD exceeds the speed limit SPDLT by the speeding threshold OSth or more. Further, the device DS performs additional (second or second) speeding notification when the own vehicle speed SPD exceeds the speed limit SPDLT and when the own vehicle HV is accelerated or is estimated to be accelerated due to the relative positional relation between the own vehicle HV and the preceding vehicle.

Specific Operation

CPU 10a of the driving assistance ECU 10 (hereinafter, simply referred to as "CPU") executes the routine illustrated in the flow charts in FIGS. 2 to 4 every time a predetermined period (calculation cycle) dt elapses. In the following description, "step" is referred to as "S".

Get Speed Limit

Figure 2:
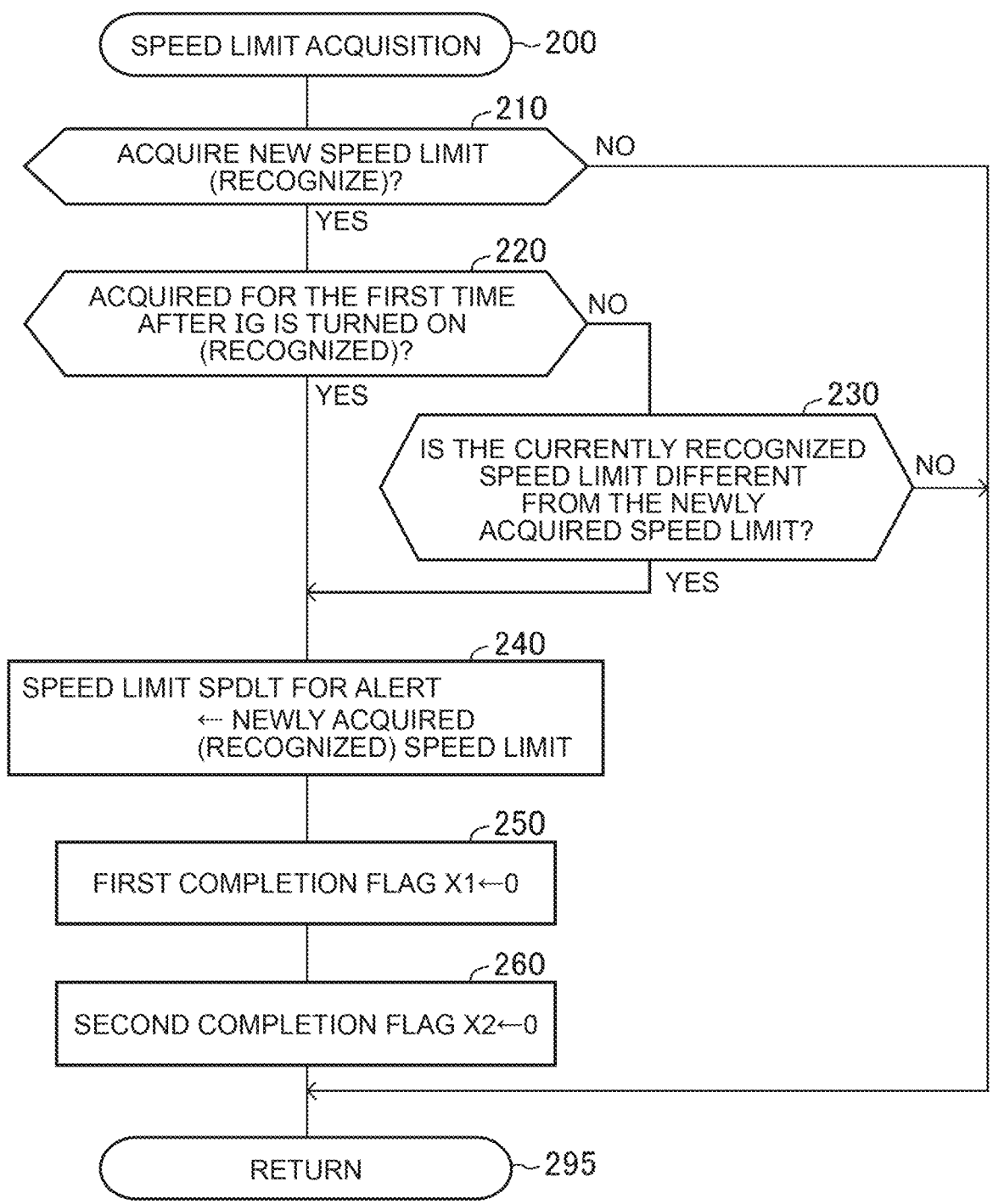
FIG. 2 is a routine executed by CPU of the driving assistance ECU shown in FIG. 1.

At a predetermined timing, CPU starts the process from S200 of FIG. 2 and proceeds to S210 to determine whether or not the speed limit set for the own lane is newly acquired (image recognition) based on the image data transmitted from the camera device 20. CPU may acquire, via the navigation ECU 80, a speed limit set for the own lane from the present position of the own vehicle HV and the map data stored in the map database 82.

If the speed limit is newly obtained, CPU proceeds from S210 to S220. CPU determines whether the speed limit newly acquired by S210 is the speed limit acquired only after the ignition key switch (not shown) of the own vehicle HV is changed from the off position to the on position (after IG is turned on). If the newly acquired speed limit is the speed limit acquired for the first time after IG is turned on, CPU proceeds from S220 to a S240 to be described later.

On the other hand, if the newly acquired speed limit is not the speed limit acquired for the first time after IG is turned on, CPU proceeds from S220 to S230. CPU determines whether or not the speed limit SPDLT for alerting described later, which is recognized by CPU at the present time, is different from the newly acquired speed limit. If the currently recognized speed limit SPDLT for alerting differs from the newly acquired speed limit, CPU proceeds from S230 to S240.

CPU is S240, with setting the speed limit newly acquired to the speed limit SPDLT for reminder, display the symbol corresponding to the speed limit SPDLT for reminder in the area 71a of the indicator 71. Thereafter, CPU performs the "S250 and S260 process" described below, proceeds to S295, and ends the routine once.

S250: CPU sets the first completion flag X1 to "0". As will be described later, the first completion flag X1 indicates that, when the value is "1", the first speeding notification is made after the new speed limit SPDLT for calling attention is set (in other words, after the speed limit SPDLT for calling attention is changed) (see S320 of FIG. 3).

S260: CPU sets the second completion flag X2 to "0". As will be described later, the second completion flag X2 indicates that, when the value is "1", the first speeding notification is made after the new attention calling speed limit SPDLT is set, and then the additional (second) speeding notification is made while the own vehicle speed SPD continues to exceed the speed limit SPDLT (see S350 of FIG. 3).

The respective values of the flag X1 and the flag X2 are set to "0" in the initialization routine executed by CPU when the ignition key switch is changed from the off position to the on position.

In addition, if CPU determines "No" in any of S210 and S230 steps, it proceeds directly to S295 from the step determined to be "No".

Notification of Speeding (Speeding Notification)

Figure 3:
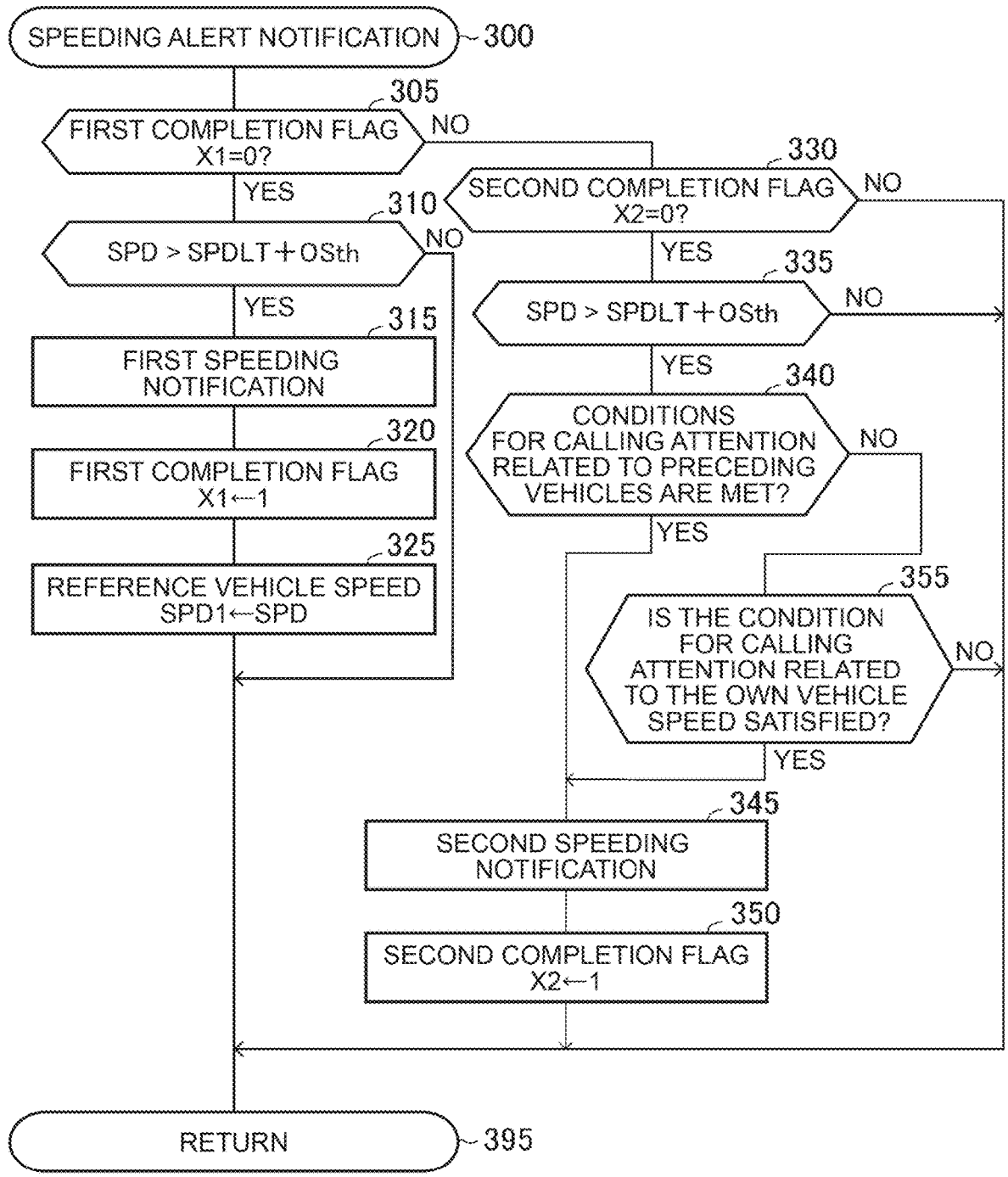
FIG. 3 is a routine executed by CPU of the driving assistance ECU shown in FIG. 1.

At a predetermined timing, CPU starts the process from S300 of FIG. 3, proceeds to S305, and determines whether the first completion flag X1 is "0".

When the value of the first completion flag X1 is "0", CPU proceeds from S305 to S310 and determines whether or not the own vehicle speed SPD is larger than the "value obtained by adding the speeding threshold OSth to the speed limit SPDLT". Here, the speeding threshold OSth is set to a constant value (e.g., 5 km/h), but may be a value equal to or greater than "0 km/h", and may be changed by operating the customizing device 73 as described later. If the own vehicle speed SPD does not exceed the "speed limit SPDLT plus the speeding threshold OSth", CPU proceeds directly from S310 to S395 and terminates the routine once.

On the other hand, when the own vehicle speed SPD is larger than the "speed limit SPDLT plus the speeding threshold OSth", CPU determines "Yes" in S310, and executes the "S315 to S325 process" described below. CPU then proceeds to S395.

S315: CPU executes the first speeding notification (alert notification) after the new alert speed limit SPDLT is set. That is, CPU blinks the speed limit displayed on the area 71a of the indicator 71 (i.e., a symbol indicating the speed limit SPDLT for calling attention). CPU blinks a symbol that alerts the surroundings of the displayed speed limit. CPU generates a notification sound from the alarm sound generating device 72. However, the notification method is not limited to this.

S320: CPU sets the first completion flag X1 to "1".

S325: CPU acquires the own vehicle speed SPD at the present time (that is, at the time when the first speeding notification is executed) as the reference vehicle speed SPD1 and stores it in RAM 10c.

On the other hand, CPU proceeds from S305 to S330 if the value of the first completion flag X1 when CPU proceeds to S305 is not "0", and determines whether the value of the second completion flag X2 is "0".

When the value of the second completion flag X2 is "0", CPU proceeds from S330 to S335 and determines whether or not the own vehicle speed SPD is larger than the "value obtained by adding the speeding threshold OSth to the speed limit SPDLT". If the own vehicle speed SPD is greater than "the speed limit SPDLT plus the speeding threshold OSth", CPU proceeds from S335 to S340. CPU determines whether or not the "alert condition related to the preceding vehicle (one of the execution conditions of the additional speeding notification)" described below is satisfied. The preceding vehicle is another vehicle traveling in the own lane and traveling immediately before the own vehicle HV and within a predetermined range from the own vehicle HV. The attention calling condition related to the preceding vehicle is a condition that is satisfied when both of the following condition A1 and condition B1 are satisfied, and is referred to as a "first attention calling condition related to the preceding vehicle" for convenience.

First Alert Condition Related to Preceding Vehicle (Condition A1) When the own vehicle HV is following the preceding vehicle at a speed in the vicinity of the actual speed Vj or at a speed substantially the same as that of the preceding vehicle, the state of following the preceding vehicle has continued for a predetermined time or longer.

(Condition B1) After the condition A1 is satisfied, the own vehicle HV is executing an operation for overtaking the preceding vehicle without the own vehicle speed SPD falling below the speed limit SPDLT.

Here, the actual speed Vj is a mean of the vehicle speeds of the plurality of other vehicles in front of the own vehicle HV traveling in the host lane. In the present embodiment, CPU acquires the actual speed Vj from the "roadside device acquiring the actual speed Vj" by "radio communication using a communication ECU 90". The roadside device is provided for the own lane, detects the speed of the vehicle passing through the own lane using a radar, sequentially calculates the actual speed Vj, and transmits the actual speed Vj for the own vehicle HV to the own vehicle HV based on a demand from the own vehicle HV. The speed in the vicinity of the actual speed Vj is a speed within a range from a speed lower than the actual speed Vj by a predetermined minute speed to a speed higher than the actual speed Vj by a predetermined minute speed.

Further, CPU may acquire the vehicle speeds of the preceding vehicle and the "preceding vehicle of the preceding vehicle" based on the camera information and the radar information, and use the averages as the actual speed Vj. In addition, CPU may acquire (estimate) the "speed of the preceding vehicle when the preceding vehicle is not accelerating or decelerating" as the actual speed Vj based on the radar data.

When all of the following "overtaking determination conditions 1 to 4" are satisfied, CPU determines that the own vehicle HV is executing an operation for overtaking the preceding vehicle (the condition B1 is satisfied).

(Overtaking Determination Condition 1) The winker switch 96 generates a signal that causes the "direction indicator on either side of the left or right" to blink.

(Overtaking Determination Condition 2) From the point of time when the overtaking determination condition 1 is satisfied, the lateral position of the own vehicle HV is moved to the "side where the directional indicator is blinking" by a predetermined lateral position moving amount threshold or more. The lateral position change amount (movement amount) may be obtained based on camera-information, or may be obtained based on an integral of the detected yaw-rate Yr.

(Overtaking Determination Condition 3) From the point of time when the overtaking determination condition 1 is satisfied, the own vehicle speed SPD has increased by the first own vehicle speed increasing threshold (overtaking determination vehicle speed threshold) Da or more. Note that the overtaking determination condition 3 may be omitted. In this case, the first alert condition is a condition that is satisfied when it is predicted that the own vehicle speed increases due to the own vehicle HV starting the overtaking operation.

Figure 5A:
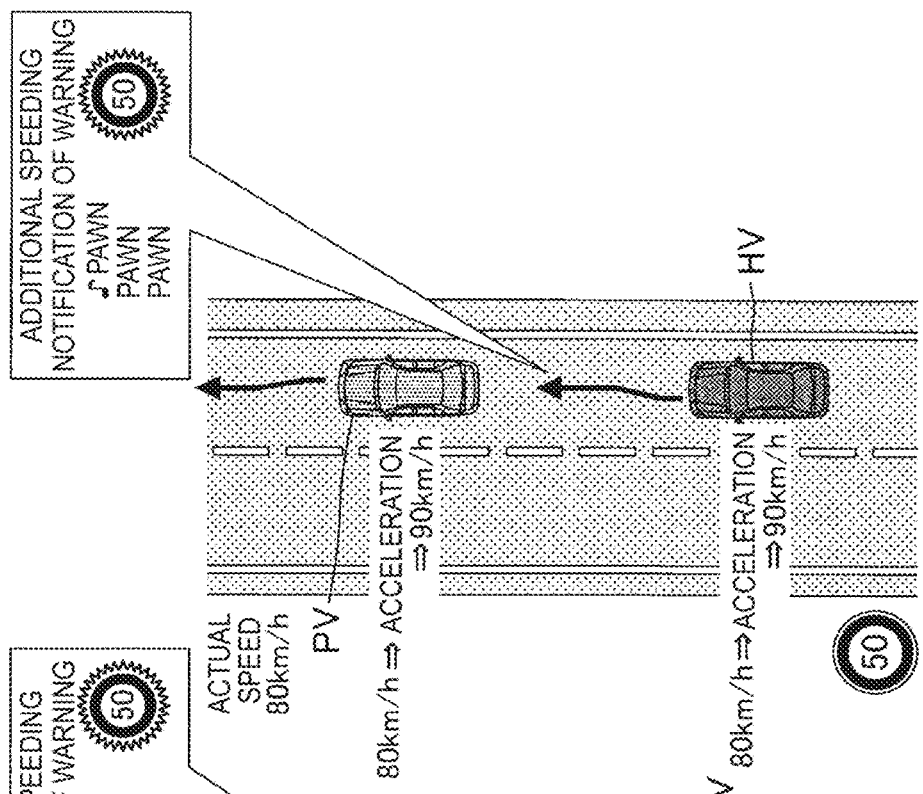
FIG. 5A shows a scene when the driving assistance device according to the first embodiment of the present disclosure performs additional notification.

When the first alert condition related to the preceding vehicle is satisfied (refer to FIG. 5A showing the own vehicle HV and the preceding vehicle PV), CPU proceeds from S340 to S345, and executes an additional speeding notification (second alert notification) for notifying that the own vehicle speed SPD exceeds the speed limit SPDLT. The notification is the same as the first speeding notification executed by S315 process. Next, CPU proceeds to S350, sets the second completion flag X2 to "1", and proceeds to S395.

On the other hand, when the first alert condition related to the preceding vehicle is not satisfied when CPU proceeds to S340, CPU proceeds from S340 to S355 to determine whether or not the alert condition related to the own vehicle speed is satisfied. The alert condition related to the own vehicle speed is a condition that is satisfied when all of the following condition X1 and condition X3 are satisfied.

Conditions for Calling Attention Related to Own Vehicle Speed (Condition X1) No preceding vehicles are present.

(Condition X2) The current own vehicle speed SPD is higher than a value (hereinafter referred to as "first threshold Db") obtained by adding the second own vehicle speed increasing threshold (increasing speed determination threshold) Db to the own vehicle speed (that is, the reference vehicle speed SPD1 acquired by S325) at the time when the first (that is, the previous) speeding notification is executed. However, the first threshold Db is set to be larger than the speeding threshold OSth. The first threshold Db may be a constant value, and may be determined in accordance with the reference vehicle speed SPD1.

(Condition X3) The current own vehicle speed SPD is higher than a threshold (hereinafter, referred to as a "second threshold") equal to $(1+\alpha)$ times the speed limit SPDLT for reminder. However, a is a value greater than 0 and less than 1, for example, 0.2. The second threshold may be a constant value, and may be determined in accordance with a speed limit SPDLT for alerting.

When the alert condition related to the own vehicle speed is satisfied, CPU proceeds from S355 to S345 and S350 to execute the additional (second) speeding notification, and sets the second completion flag X2 to "1", and then proceeds to S395.

If CPU determines "No" in any of S330, S335 and S355 steps, the process proceeds directly to S395 from the step determined as "No".

Cancellation of Speeding Notification

Figure 4:
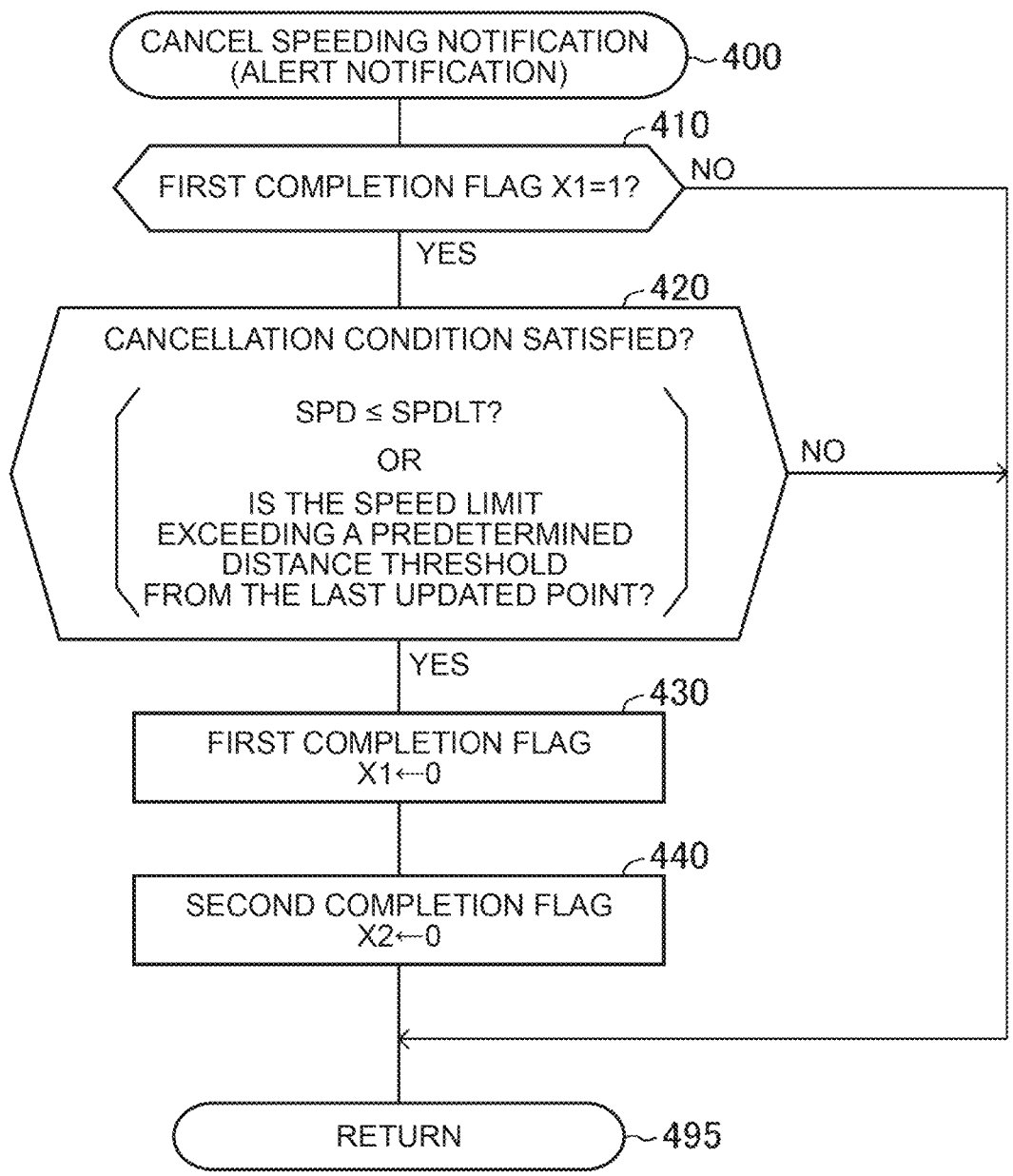
FIG. 4 is a routine executed by CPU of the driving assistance ECU shown in FIG. 1.

At a predetermined timing, CPU starts the process from S400 of FIG. 4 and proceeds to S410 to determine whether the first completion flag X1 is "1".

When the first completion flag X1 is "1", CPU proceeds from S410 to S420 to determine whether or not the speeding notification is cancelled. This cancellation condition is satisfied when at least one of the following "condition CACL1 and condition CACL2" is satisfied. If the cancellation criterion is not satisfied, CPU proceeds from S410 to S495.

Cancellation Condition for Speeding Notification
(Condition CACL1) The own vehicle speed SPD becomes lower than the speed limit SPDLT.
(Condition CACL2) The own vehicle HV travels from a point where the speed limit SPDL is updated (that is, a position of the own vehicle HV at a time point when S240 is executed) to a predetermined distance threshold or more.

If the cancellation condition of the speeding notification is satisfied, CPU determines "Yes" in S420, performs the "S430 and S440 process" described below, and then proceeds to S495 to temporarily terminate the routine.

S430: CPU sets the first completion flag X1 to "0". S440: CPU sets the second completion flag X2 to "0".

As described above, the device DS according to the first embodiment performs the additional speeding notification when the first alert condition related to the preceding vehicle is satisfied. It should be noted that CPU may be configured such that the speeding notification is not performed in a period in which the own vehicle HV straddles the "lane division between the own lane and the lane adjoining the own lane" after the time when the condition B1 is satisfied. This is because if the speeding notification is executed while the own vehicle HV straddles the dividing line, the driver may be disrupted.

2. Second Embodiment

The device DS according to the second embodiment of the present disclosure determines whether or not the "second alert condition related to the preceding vehicle" is satisfied, in which CPU of the driving assistance ECU 10 differs from the "first alert condition related to the preceding vehicle" in S340 of FIG. 3. Only in this respect, the device DS according to the second embodiment is different from the device DS according to the first embodiment. This difference will be described below.

The second alert condition related to the preceding vehicle is a condition that is satisfied when all of the following condition A2, condition B2, and condition C2 are satisfied.

Second Alert Condition Related to Preceding Vehicle
(Condition A2) The same condition as the condition A1.
(Condition B2) There is no preceding vehicle on which the own vehicle HV was following. (Condition C2) From the point in time when the preceding vehicle in which the own vehicle HV was following is no longer present, the own vehicle speed SPD has increased by more than the third own vehicle speed increasing threshold (independent acceleration determination threshold) Dc without the own vehicle speed SPD falling below the speed limit SPDLT.

Figure 5B:
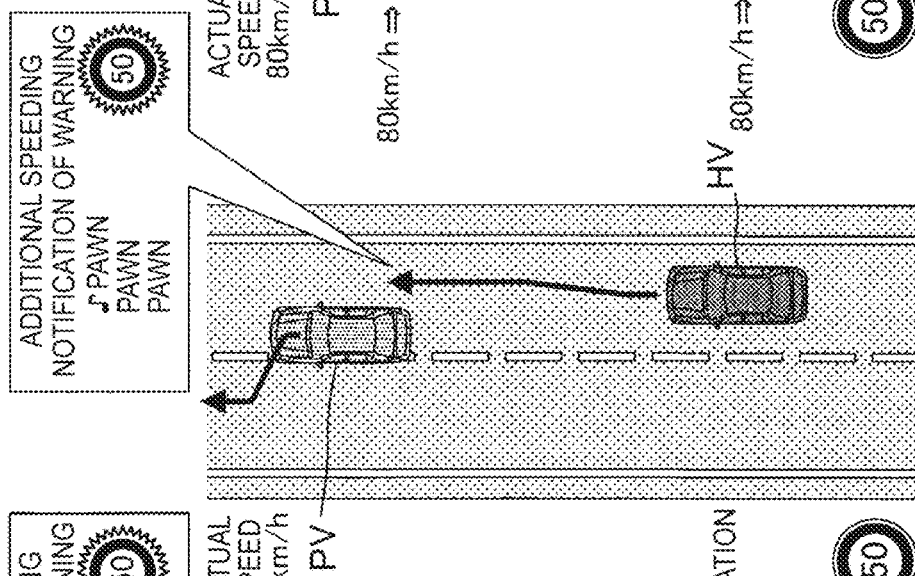
FIG. 5B shows a scene when the driving assistance device according to a second embodiment of the present disclosure performs additional notification.

When the second alert condition related to the preceding vehicle is satisfied (refer to FIG. 5B showing the own vehicle HV and the preceding vehicle PV), CPU proceeds from S340 to S345 and S350, and then proceeds to S395.

The condition C2 may be omitted. In this case, when there is no preceding vehicle on which the own vehicle HV has been following, an additional speeding notification is executed immediately. That is, the second alert condition in which the condition C2 is omitted is a condition that is satisfied when it is predicted that the own vehicle speed increases due to the absence of the preceding vehicle.

3. Third Embodiment

The device DS according to the third embodiment of the present disclosure determines whether or not the "third alert condition related to the preceding vehicle" is satisfied, in which CPU of the driving assistance ECU 10 differs from the "first alert condition related to the preceding vehicle" in S340. In this respect only, the device DS according to the third embodiment is different from the device DS according to the first embodiment. This difference will be described below.

The third alert condition related to the preceding vehicle is a condition that is satisfied when all of the following condition A3, condition B3, and condition C3 are satisfied.

Third Alert Condition Related to Preceding Vehicle
(Condition A3) The same condition as the condition A1.
(Condition B3) The preceding vehicle, on which the own vehicle HV was following, accelerated. Specifically, the vehicle speed of the preceding vehicle is larger than "the actual speed Vj plus the preceding vehicle acceleration determination thresholds Pa". Whether or not the preceding vehicle has accelerated can be determined based on the relative speed of the preceding vehicle or the inter-vehicle distance from the preceding vehicle and the own vehicle speed SPD based on the camera information, the radar information, and the like.
(Condition C3) The own vehicle HV accelerated according to the acceleration operation of the preceding vehicle, without the own vehicle speed SPD falling below the speed limit SPDLT after the condition A1 was satisfied. The own vehicle speed SPD has increased from "the own vehicle speed at the time when the preceding vehicle starts acceleration" by more than the fourth own vehicle speed increasing threshold (follow-up acceleration determination threshold) Dd.

Figure 5C:
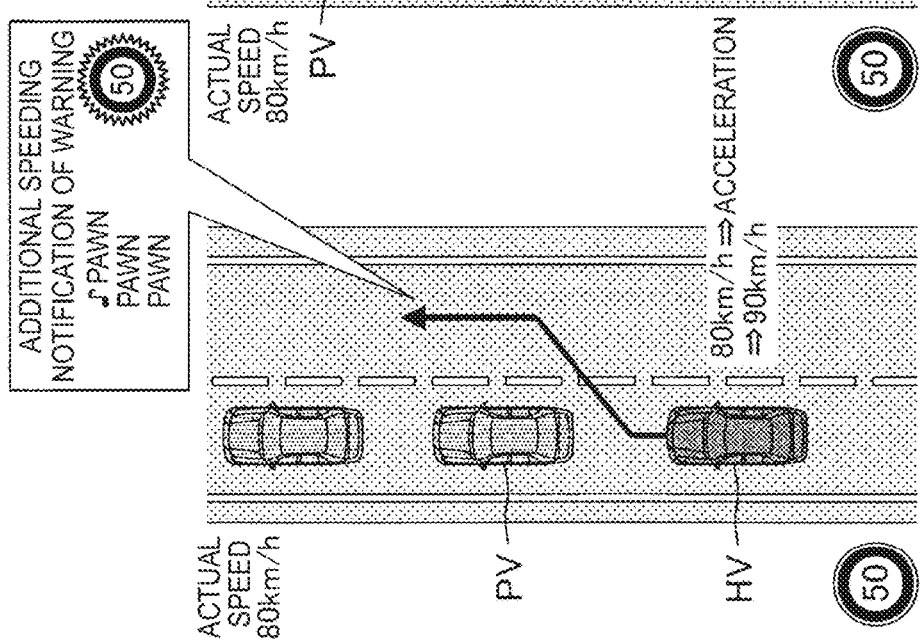
FIG. 5C shows a scene when the driving assistance device according to a third embodiment of the present disclosure performs additional notification.

When the third alert condition related to the preceding vehicle is satisfied (refer to FIG. 5C showing the own vehicle HV and the preceding vehicle PV), CPU proceeds from S340 to S345 and S350, and then proceeds to S395.

The condition C3 may be omitted. In this case, in the third alert condition, when the preceding vehicle on which the own vehicle HV has been following starts to accelerate, the additional speeding notification is executed immediately. That is, the third alert condition in which the condition C3 is omitted is a condition that is satisfied when the own vehicle speed is predicted to increase due to the relative positional relation with the own vehicle HV.

Modification

In the modification of the device DS according to the first to third embodiments, the driver of the own vehicle HV can set (change) the speeding threshold OSth using the customizing device 73. For example, as shown in the setting table of FIG. 6, the driver selects one of the settings 1 to 3 by using the customizing device 73, and thereby uses a value determined for each setting as the speeding threshold OSth. For example, when the driver selects the setting 1, the speeding threshold OSth is set to 10. A (km/h). Here, A (km/h) is, for example, 1 (km/h). That is, the driver can select the first speeding notification when the own vehicle speed SPD exceeds the speed limit SPDLT by what speed.

Further, CPU automatically changes the first to fourth own vehicle speed increasing thresholds (Da, Db, Dc, Dd) according to the set (selected) speeding threshold OSth. For example, when the driver selects the setting 1, the first to fourth own vehicle speed increasing thresholds (Da, Db, Dc, Dd) are set to 15·A (km/h). According to the setting table illustrated in FIG. 6, the higher the selected speeding threshold OSth, the higher the first to fourth own vehicle speed increasing thresholds (Da, Db, Dc, Dd) are set. Note that the numerical values shown in FIG. 6 are examples, and are set to various values as appropriate. Also, the number of settings that can be set is not necessarily "3".

As is apparent from the above, the first to third alert conditions are conditions that are satisfied when it is predicted that the own vehicle speed increases or increases due to the relative positional relation between the preceding vehicle and the own vehicle HV. Therefore, according to the embodiment and the modification thereof, the speeding notification can be performed at an appropriate time based on the relative positional relation between the preceding vehicle and the own vehicle HV.

The present disclosure is not limited to the above-described embodiments and modifications, and various modifications can be adopted within the scope of the present disclosure. For example, CPU determines, in S340, whether or not any two or more of the first to third alert conditions related to the preceding vehicles are satisfied. When CPU determines that at least one of the conditions for determining whether or not the condition is satisfied is satisfied, it may proceed from S340 to S345 to perform additional speeding notification.

Further, the device DS according to the above-described embodiments may perform the additional speeding notification when at least one of the "first to third attention calling conditions related to the preceding vehicle and the attention calling conditions related to the own vehicle speed" is satisfied after the second speeding notification.

More specifically, for example, in the first embodiment, the own vehicle HV executes an operation for overtaking the preceding vehicle. The first alert condition related to the preceding vehicle is established. Accordingly, the second speeding notification is made. Thereafter, a new preceding vehicle exists in the neighboring lane that the own vehicle HV newly enters in order to carry out the overtaking, or in the original host lane that has returned after the overtaking operation is completed. When one of the first to third alert conditions related to the preceding vehicle is satisfied with respect to the new preceding vehicle, the device DS may make an additional speeding notification.

The same applies to the second embodiment and the third embodiment, and the device DS may perform additional speeding notification every time any one of the second and third alert conditions related to the preceding vehicle is satisfied. Further, the first threshold value of the condition X2 may be a value of increasing the reference vehicle speed SPD1 by a predetermined ratio (e.g., 1.1. SPD1), and the second threshold value of the condition X3 may be a value obtained by adding the speeding threshold Df exceeding the speed limit to the limited vehicle speed SPDL. The first to fourth own vehicle speed increasing thresholds (Da, Db, Dc, Dd) may be an appropriate value of 0 or more including "0".

What is claimed is:

1. A driving assistance device for a vehicle, the driving assistance device comprising:
   a speed limit acquisition unit for acquiring a speed limit applied to an own vehicle;
   an own vehicle speed acquisition unit that acquires an own vehicle speed that is a speed of the own vehicle; and
   an alert notification unit that performs a first notification when the own vehicle speed is higher than the speed limit, and performs an additional notification when, in a state in which a state of the own vehicle speed being higher than the speed limit continues after the first notification, a predetermined alert condition that is satisfied when the own vehicle speed increases or is predicted to increase due to a relative positional relationship between a preceding vehicle traveling ahead of the own vehicle, and the own vehicle, is satisfied.

2. The driving assistance device according to claim 1, wherein the alert condition includes a condition that a state of the own vehicle changes from a state in which the own vehicle is traveling while tracking the preceding vehicle, to a state in which the own vehicle is executing an overtaking operation for overtaking the preceding vehicle.

3. The driving assistance device according to claim 1, wherein the alert condition includes a condition that a state of the own vehicle changes from a state in which the own vehicle is traveling while tracking the preceding vehicle, to a state in which the preceding vehicle is no longer present.

4. The driving assistance device according to claim 1, wherein the alert condition includes a condition that a state of the own vehicle changes from a state in which the own vehicle is traveling while tracking the preceding vehicle, to a state in which the preceding vehicle accelerates.

5. The driving assistance device according to claim 1, wherein the alert notification unit is configured to perform additional notification when, in a state in which a state of the own vehicle speed being higher than the speed limit continues after the first notification and no preceding vehicle is present, the own vehicle speed becomes greater than a first threshold value that is decided in accordance with the own vehicle speed at a point in time when the first notification is executed, and also greater than a second threshold value that is decided in accordance with the speed limit.

* * * * *